United States Patent
Gallo et al.

(10) Patent No.: US 7,487,008 B2
(45) Date of Patent: *Feb. 3, 2009

(54) VIRTUALIZATION OF DATA STORAGE LIBRARY ADDRESSES

(75) Inventors: Frank David Gallo, Tucson, AZ (US); Brian Gerard Goodman, Tucson, AZ (US); Ronald Faye Hill, Jr., Tucson, AZ (US); Leonard George Jesionowski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 489 days.

This patent is subject to a terminal disclaimer.

(21) Appl. No.: 11/212,556

(22) Filed: Aug. 24, 2005

(65) Prior Publication Data

US 2006/0004482 A1 Jan. 5, 2006

Related U.S. Application Data

(63) Continuation of application No. 10/646,234, filed on Aug. 22, 2003, now Pat. No. 6,950,723.

(51) Int. Cl.
*G06F 7/00* (2006.01)
(52) U.S. Cl. ..................... 700/214
(58) Field of Classification Search ............. 700/214, 700/213, 215, 218, 225; 369/32, 33; 711/111
See application file for complete search history.

(56) References Cited

U.S. PATENT DOCUMENTS

| | | | |
|---|---|---|---|
| 5,459,848 A | 10/1995 | Mase | |
| 5,761,503 A * | 6/1998 | Fisher | 707/104.1 |
| 5,963,971 A | 10/1999 | Fosler et al. | |
| 6,185,165 B1 * | 2/2001 | Jesionowski et al. | 369/30.34 |
| 6,336,163 B1 * | 1/2002 | Brewer et al. | 711/112 |
| 6,338,006 B1 | 1/2002 | Jesionowski et al. | |
| 6,425,059 B1 * | 7/2002 | Basham et al. | 711/153 |
| 6,480,905 B1 * | 11/2002 | Jesionowski et al. | 710/8 |
| 6,487,474 B1 * | 11/2002 | Goodman et al. | 700/245 |
| 6,574,641 B1 * | 6/2003 | Dawson et al. | 707/204 |
| 6,577,562 B2 | 6/2003 | Gallo et al. | |
| 2004/0153205 A1 * | 8/2004 | Goodman et al. | 700/214 |

FOREIGN PATENT DOCUMENTS

| EP | 0859308 | 8/1998 |
|---|---|---|
| JP | 61234425 | 10/1986 |
| JP | 2001076409 | 1/2003 |

* cited by examiner

*Primary Examiner*—Gene O. Crawford
*Assistant Examiner*—Ramya G Prakasam
(74) *Attorney, Agent, or Firm*—Janaki Davada; Konrad Raynes & Victor LLP

(57) ABSTRACT

Disclosed is a method, system, and program for using storage slots efficiently. A storage element count is assigned to each one of multiple logical libraries, and the sum of the storage element count for each one of the multiple logical libraries exceeds the total number of storage slots in the library.

7 Claims, 11 Drawing Sheets

Table A 900

| | To Host Storage Element | To Host Import Export Element | To Data Transfer Element |
|---|---|---|---|
| From Host Storage Element | * Remove source host storage element entry from library map table<br>* Add destination host storage element entry to library map table<br>* Update Volser table<br>* Return status | * Remove source host storage element entry from library map table<br>* Add destination host import export element entry to library map table<br>* Update Volser table<br>* Return status<br>* Queue physical move to any empty I/O slot | * Perform move (update library status table)<br>* Remove source host storage element entry from library map table<br>* Update Volser table<br>* Return status |

FIG. 9A

| | To Host Storage Element | To Host Import Export Element | To Data Transfer Element |
|---|---|---|---|
| From Host Import Export Element | * If logical library number indicates for the destination that the element is not assigned to a logical library, assign logical library number<br>* Remove source host import export element entry from library map table<br>* Add destination host storage element entry to library map table<br>* Update Volser table<br>* Return status | * Remove source host import export element entry from library map table<br>* Add destination host import export element entry to library map table<br>* Update Volser table<br>* Return status (physical move should already be queued or already complete) | * If logical library number for the destination indicates that the element is not assigned to a logical library, assign logical library number<br>* Perform move (update library status table)<br>* Remove source host import export element entry from library map table<br>* Update Volser table<br>* Return status |

FIG. 9B

|  | To Host Storage Element | To Host Import Export Element | To Data Transfer Element |
|---|---|---|---|
| From Data Transfer Element (e.g., drive) or Medium Transport Element (e.g., gripper) | * Perform move to any available storage slot and update library status table<br>* Add destination host storage element entry to library map table<br>* Update Volser table<br>* Return status | * Perform move to any available storage slot and update library status table<br>* Add destination host import export element entry to library map table<br>* Update Volser table<br>* Return status<br>* Queue physical move to any I/O slot | * Perform move and update library status table<br>* Update Volser table<br>* Return status |

FIG. 9C

VIRTUALIZATION OF DATA STORAGE LIBRARY ADDRESSES

CROSS-REFERENCE TO RELATED APPLICATIONS

This application is a continuation application of and claims the benefit of " METHOD, SYSTEM, AND PROGRAM FOR VIRTUALIZATION OF DATA STORAGE LIBRARY ADDRESSES", having application Ser. No. 10/646,234, filed Aug. 22, 2003, issued as U.S. Pat. No. 6,950,723 on Sep. 27, 2005, the disclosure of which is incorporated herein by reference in its entirety.

BACKGROUND OF THE INVENTION

1. Field of the Invention

The present invention relates to virtualization of data storage library addresses.

2. Description of the Related Art

Many data processing systems require a large amount of data storage, for use in efficiently accessing, modifying, and re-storing data. One type of data storage includes removable media storage libraries, such as tape libraries, electronic media libraries, and optical disk libraries. Access to library data may be slow because a robot or human is necessary to select and load the needed data storage medium. An advantage of these storage systems is the reduced cost for very large data storage capabilities, on the order of terabytes of data. Furthermore, removable media storage is especially useful for backup purposes. That is, data stored at the higher levels of data storage hierarchy is reproduced for safe keeping on removable media. Access to data stored in a library is presently on the order of seconds.

There are a number of different data storage libraries on the market today, including models made by International Business Machines ("IBM"). A number of data storage libraries today utilize the small computer system interface ("SCSI") medium changer standard. This standard is "location-centric" because it requires an application program at a host to manage data storage cartridge movement by specifying source and destination locations in the system. Each location is a site capable of holding a cartridge, and is referred to as an "element." Each element is given a fixed element address, either at the time of manufacture or at the time of system installation or configuration.

The SCSI medium changer protocol defines four types of elements: medium transport element, storage element, import export element, and data transfer element. In physical terms, the medium transport element is an accessor gripper, a storage element is a storage slot, an import export element is a library I/O slot or pass-through slot through which robotics or a human operator may insert or eject a cartridge, and a data transfer element is a removable media drive that is capable of reading data on and/or writing data to a cartridge.

Moves from one element to another are requested on the SCSI interface through a SCSI Move Medium command that specifies a source and destination location. Typically, moves from one element to another element are the responsibility of SCSI initiator software, such as independent software vendor programming.

An automated data storage library includes removable media drives and storage slots. Some automated data storage libraries can be partitioned into one or more logical libraries, where each logical library appears as a separate and distinct library to the application program and where, in conventional systems, cartridges in one logical library cannot be accessed from other logical libraries. When partitioning such libraries, each logical library is assigned storage slots, which may be referred to as "logical library storage slots" for ease of reference, and the logical library storage slots may be assigned in a sequential basis from the pool of storage slots. This is done, for example in an IBM® UltraScalable Tape Library 3584.

As an example, if an automated data storage library contains 100 contiguous storage slots, logical library 1 can be allocated 25 of the storage slots so that storage slots 1 through 25 are logical library storage slots 1 through 25. Logical library 2 can then be allocated the remaining 75 storage slots in the library so that logical library 2 has logical library storage slots 1 through 75 that correspond to storage slots 26 through 100. This is a fixed mapping of logical library storage slots to the storage slots in the pool of storage slots. The mapping may be done during configuration of the library.

With this type of allocation, several problems arise. One problem is that a reconfiguration of the library is required if the number of storage slots to be allocated to a logical library is changed (e.g., logical library 1 needs 30 storage slots). Also, a storage slot cannot be periodically used by a different logical library without reconfiguration. Moreover, adding new storage slots requires reconfiguration. This type of allocation limits the ability for concurrent, nondisruptive library expansion or contraction (i.e., adding or removing storage slots). Furthermore; a storage slot may be a "fixed home slot" for a cartridge. The term "fixed home slot" refers to the first storage slot into which a cartridge was inserted. After the cartridge is used by an application program, the cartridge is returned to its home slot, which may not be the closest available empty storage slot.

U.S. Pat. No. 6,338,006 B1 describes a data storage library that efficiently utilizes I/O slots while maintaining software compatibility by using functional addresses to conduct virtual cartridge moves from storage slots to I/O slots. A location-centric library application program manages cartridge movement according to functional storage addresses and functional I/O addresses. In reality, the library has multiple cartridge receiving slots, which include I/O slots and storage slots. In contrast with the I/O slots and storage slots, functional I/O addresses and functional storage addresses are virtual locations used by the application program in managing cartridge locations. Thus, application program knowledge of cartridge locations is limited to their functional addresses. The library includes a library map that correlates functional addresses with physical addresses. Initially, an eject command is received from the application program. The eject command requests transfer of a cartridge from a source functional storage address to a target functional I/O address. In response to the eject command, irrespective of any physical movement of the cartridge, the library reports successful completion of the requested eject command to the application program. The library first gives a functional I/O address to the storage slot containing the cartridge. When an I/O slot becomes available, the library physically moves the cartridge there and either correlates the cartridge's functional I/O address with this I/O slot, or registers the cartridge's functional I/O address as empty.

Notwithstanding the techniques described in U.S. Pat. No. 6,338,006 B1, there is a need in the art for improved storage allocation systems.

SUMMARY OF THE INVENTION

Provided are a method, system, and program in which a storage element count is assigned to each one of multiple logical libraries, and the sum of the storage element count for each one of the multiple logical libraries exceeds the total number of storage slots in the library.

In further implementations, a storage slot count greater than a total number of storage slots in a library is assigned to one or more logical libraries. New storage slots are added to the library. Then, one or more of the logical libraries may be associated with the newly added storage slots.

The described implementations of the invention provide a method, system, and program for virtualization of storage slot addresses in an automated data storage library supporting multiple logical libraries.

BRIEF DESCRIPTION OF THE DRAWINGS

Referring now to the drawings in which like reference numbers represent corresponding parts throughout:

FIGS. 9A, 9B, and 9C illustrate Table A, which illustrates SCSI moves in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
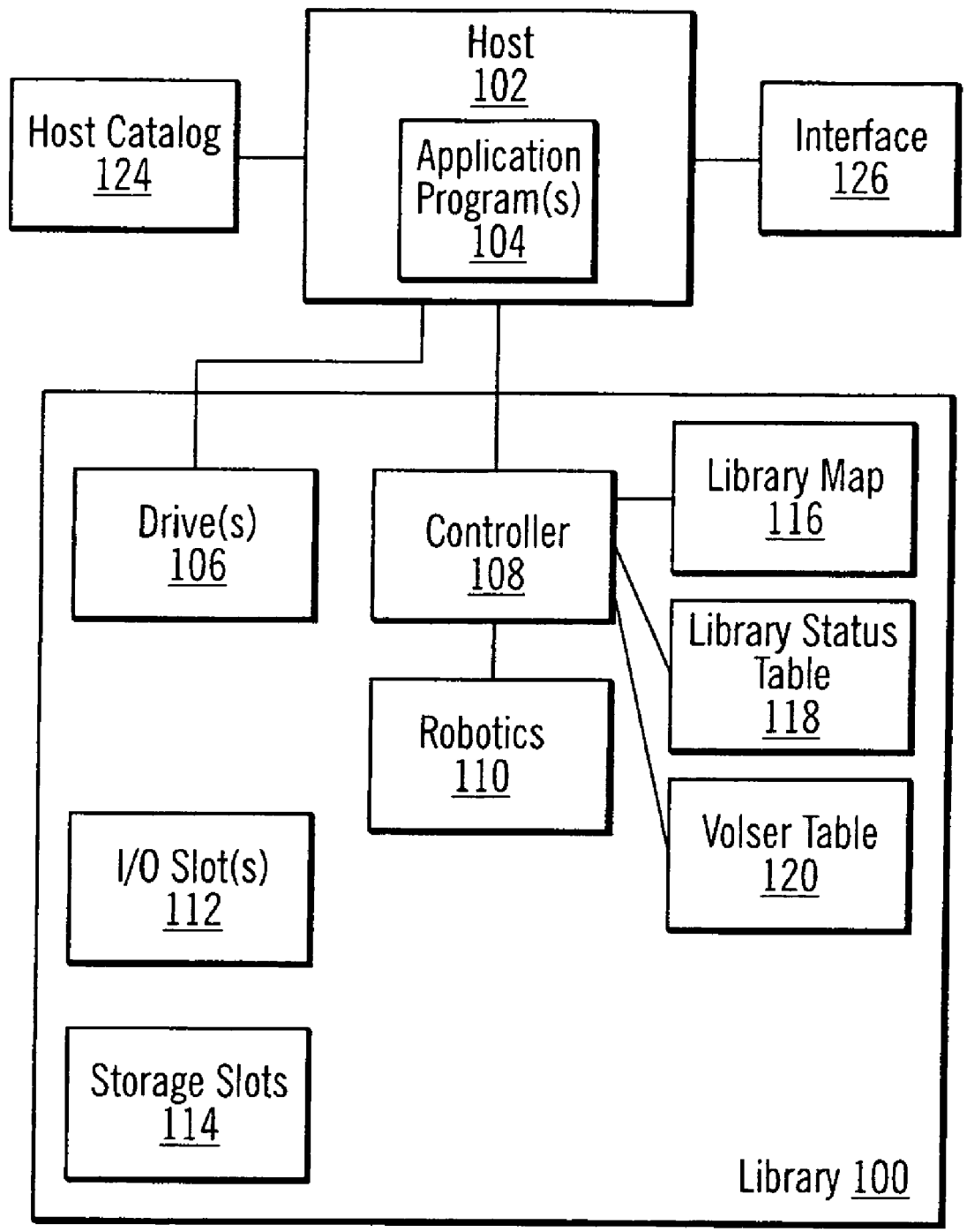
FIG. 1 illustrates, in a block diagram, a computing environment in accordance with certain implementations of the invention.

FIG. 1 illustrates, in a block diagram, a computing environment in accordance with certain implementations of the invention. A data storage library 100 is coupled to a host 102. One or more application programs 104 run on the host 102. The library 100 may include one or different types of portable (i.e., removable) data storage media, such as magnetic tape cartridges, optical cartridges, writeable CDs, electronic media, etc. For ease of reference, the portable data storage media of the library 100 are referred to as "cartridges" herein.

Among other possible functions, the host 102 supplies data to the library 100 for storage on the cartridges, and sends requests to the library 100 to retrieve data from the cartridges. The host role may be satisfied by various types of hardware, such as a digital data processing computer, logic circuit, construction of discrete circuit components, interface to a human operator, etc. As an example, the host 102 may comprise an IBM RS/6000 machine employing an operating system such as AIX®. The host 102 is also coupled to an interface 126 and a host catalog 124. The interface 126 enables the host 102 to exchange information with a human operator, and may comprise a control panel, video monitor, computer keyboard/mouse, or another appropriate human/machine interface.

The host 102 manages data in the library 100 using "location-centric" commands, and may utilize the SCSI medium changer protocol as one example. The host manages cartridge movement by specifying source and destination locations in the system. The source and destination locations are element addresses (e.g., for a host medium transport element, host storage element, host import export element, or host data transfer element).

The host element addresses include "host import export element addresses" (which the host perceives to be I/O slots) and "host storage element addresses" (which the host perceives to be storage slots). As an example, the host element addresses may be established upon configuration of the library 100 with the host 102, and would not normally change. There is a different, underlying layer of mapping that correlates the host element addresses with the actual storage slots, called "physical element addresses," which may represent storage slots or I/O slots. This configuration introduces several benefits for the library 100, as discussed in greater detail below.

To support its management of the data storage library 100 according to host element addresses, the host 102 maintains the host catalog 124. The host catalog 124 cross-references each host element address with any cartridge that is stored therein, according to the host's view. Table 1 illustrates an example of the host catalog 124 in accordance with certain implementations of the invention. Each row depicts one host element address, and cross-references this address against:

1. The perceived type of location in the library 100 represented by the host element address. This information, which includes whether the host element address represents a "import export element" or a "storage element," may be fixed during operation of the host 102. Alternatively, there may be multiple tables representing host catalog 124. For example, there may be one table for each perceived element type.

2. Whether the host element address contains a cartridge or not. This information varies during normal operation of the library 100.

3. The identity of the cartridge (if any) stored at the host element address. One type of identification is by a volume/serial number (referred to as a "volser"), as illustrated. This information varies during normal operation of the library 100.

TABLE 1

Host Catalog

| Host Element Address (Fixed) | Perceived Type of Location (Fixed) | Full or Empty? (Changeable) | Volser (Changeable) |
|---|---|---|---|
| 001 | Storage element | Full | 929475 |
| 002 | Storage element | Full | 988928 |
| 003 | Storage element | Full | 329820 |
| 004 | Storage element | Empty | None |
| ... | ... | ... | ... |
| 098 | Import export element | Full | 333820 |

TABLE 1-continued

Host Catalog

| Host Element Address (Fixed) | Perceived Type of Location (Fixed) | Full or Empty? (Changeable) | Volser (Changeable) |
|---|---|---|---|
| 099 | Import export element | Empty | None |
| 100 | Import export element | Empty | None |

The data storage library 100 includes one or more drives 106 to conduct read/write operations with cartridges in the library 100. Each drive 106 comprises suitable hardware to access the data format of a cartridge in the library 100. For example, in the case of magnetic tape cartridges, the drive 106 may comprise an IBM® model 3590 tape drive. Cartridges are moved to/from the drive 106 by robotics 110.

The library 100 also includes equipment to physically store the cartridges. For instance, storage slots 114 house cartridges when the cartridges are not being used. The storage slots 114 comprise shelves or other data storage library compartments. Each storage slot 114 has a physical element address, which is used by a library to access that storage slot. The physical element address may comprise any addressing scheme usable by the library. For example, a frame/column/row designation, spatial coordinates, arbitrary numbering of physical locations, etc. Additionally, each storage slot 114 that is treated as either a host import export element or a host storage element may have a host element address, which is used by an application program to access that element.

One or more I/O slots 112 may be provided to transfer cartridges to/from the library 100. The I/O slots 112 include any slots that are marked, known, set aside, positioned, or otherwise designated for an operator to insert cartridges into the library 100 and remove cartridges therefrom. Using the I/O slots 112, an operator can introduce cartridges into the library 100 ("insert" operation), or the library 100 can expel cartridges ("eject" operation). The I/O slots 112 may be accessible by the operator without disrupting operation of the robotics 110 or drives 106 (such as through an external door), although this is not necessary. Some examples of I/O slots 112 include "pass-through" slots, a carriage, conveyor, normal storage-type slots designated as I/O slots, etc.

To move cartridges between the drives 106, I/O slots 112, and storage slots 114, the library 100 includes robotics 110. The robotics 110 may be implemented by any suitable cartridge movement machinery, such as robotic arms, integrated cartridge loading equipment, conveyors, grippers movable on an X-Y coordinate system, etc.

The library 100 operates under supervision of a controller 108, which receives commands from the host 102 requesting the controller 108 to move cartridges from one host element address to another. The controller 108 communicates with the host 102 by interfaces such as wires/cables, one or more busses, fiber optic lines, wireless transmission, intelligent communications channel, etc. In addition to this host-controller interface, which constitutes a "control" path, the library 100 also includes a "data" path that carries data between the host 102 and a drive 106. The control paths and the data paths may share the same interface or may comprise different interfaces.

The controller 108 comprises a digital data processing machine, logic circuit, construction of discrete circuit components, or other automated mechanism, and operates according to suitable programming, physical configuration, etc. To provide a specific example, the controller 108 may comprise an IBM PowerPC processor.

Tables 116, 118, and 120 are maintained by the controller 108. The tables include a library map 116, a library status table 118, and a volser table 120. In certain implementations, each table 116, 118, and 120 is sorted by first parameter, unless otherwise noted. Upon initialization or some resetting events, the tables 116, 118, and 120 are initialized.

A library map 116 is a table that maps an application program's view of element addresses to the library's view of the physical elements. The library map 116 includes columns for a logical library number, a host element address (i.e., used by an application), a perceived type of location (i.e., storage element or import export element), and a physical element address (i.e., used by a library). A host element address is used by the application program and may refer to either a host storage element or a host import export element. The library map 116 may be stored in volatile memory.

For each host element address, the library map 116 identifies a corresponding physical element address, if one has been associated with that host element address. In certain implementations of the invention, the physical element address is described using (row, column) and side. For example, a physical element address of (1,1) Left indicates that the row is 1, the column is 1, and the side is the left side of the library in a two sided library. Table 2 illustrates an example of a library map 116 in accordance with certain implementations of the invention. Each row depicts one host element address and the associated physical element address. In this example, the physical element addresses comprise horizontal and vertical coordinates for a robotic gripper.

TABLE 2

Library Map

| Logical Library Number | Host Element Address (Fixed) | Perceived Type of Location (Fixed) | Physical Element Address (Changeable) |
|---|---|---|---|
| 001 | 001 | Storage Element | (1,1) Left |
| 001 | 002 | Storage Element | (1,1) Right |
| 001 | 003 | Storage Element | (1,2) Left |
| 001 | 004 | Import Export Element | Unassociated |
| ... | ... | ... | ... |
| 526 | 001 | Storage Element | (4,5) Left |
| 526 | 002 | Import Export Element | Unassociated |
| 526 | 003 | Import Export Element | Unassociated |

A library status table 118 has columns for a physical element address, a full or empty status, a type of location, and a volume/serial number (i.e., a volser). As described above, a physical element address is used internally by the library. The library status table 118 may be stored in volatile memory. Table 3 illustrates an example of a library status table 118 in accordance with certain implementations of the invention.

TABLE 3

Library Status Table

| Physical Element address (Fixed) | Full or Empty? (Changeable) | Type of Location (Fixed) | Volser (Changeable) |
|---|---|---|---|
| (1,1) Left | FULL | Storage Element | 001ABC |
| (1,1) Right | FULL | Storage Element | 03592M |
| (1,2) Left | FULL | Storage Element | 23LJO9 |
| ... | ... | ... | ... |
| (4,5) Left | FULL | Import Export Element | 98765Z |
| (5,8) Right | EMPTY | Import Export Element | NONE |
| ... | ... | ... | ... |
| (10,10) Right | EMPTY | Drive | NONE |

A volser table 120 has columns for a volume/serial number, a physical element address, a logical library number, and a host element address. The volser table 120 may be stored in volatile memory. In certain implementations, the volser table 120 is optional for faster search capability when a volume/serial number is provided. Table 4 illustrates an example of a volser table 120 in accordance with certain implementations of the invention.

TABLE 4

Volser Table

| Volser (Changeable) | Physical Element Address (Changeable) | Logical Library Number | Host Element Address (Fixed) |
|---|---|---|---|
| 001ABC | (1,1) Left | 005 | 923 |
| 03592M | (1,1) Right | 004 | 127 |
| 23LJO9 | (1,2) Left | 003 | 864 |
| 7973AB | (8,9) Right | Unassigned | Unassigned |
| ... | ... | ... | ... |
| 98765Z | (4,5) Left | 001 | 235 |
| DGCE12 | (9,8) Right | Unassigned | Unassigned |
| XYZ825 | (10,10) Left | Unassigned | Unassigned |

In certain implementations of the invention, a subset of the volser table 120 may be stored in non-volatile storage (e.g., Non-Volatile Random Access Memory (NVRAM)), with additional copies elsewhere for security reasons. Alternatively, the ranges of volsers may be assigned to various logical libraries. For example, volsers A00000-A99999 may be assigned to logical library 1, while volsers B00000-B99999 may be assigned to logical library 2. These assignments and/or the policy used to generate the assignments may be stored in non-volatile storage (e.g., Non-Volatile Random Access Memory (NVRAM)), with additional copies elsewhere for security reasons. The non-volatile information is used to retain the association between a cartridge and a particular logical library. Alternatively, the technique of storing the logical library association in a cartridge may be used, as described in U.S. patent application Ser. No. 10/356,577 with Attorney Docket Number TUC920020015US1, entitled "USE OF CARTRIDGE MEMORY FOR STORING LIBRARY ASSOCIATION INFORMATION", filed on Feb. 3, 2003, by B. G. Goodman et al. and U.S. patent application Ser. No. 10/356,487 with Attorney Docket Number TUC920020115US1, entitled "USE OF CARTRIDGE MEMORY FOR STORING LOGICAL LIBRARY ASSOCIATION INFORMATION", filed on Feb. 3, 2003, by B. G. Goodman et al, each of which is incorporated by reference herein in its entirety.

After receiving location-centric commands from the host 102 referencing host element addresses (i.e., host import export element addresses or host storage element addresses), the controller 108 translates these commands into physical locations present in the library 100 and implements the requested operations by directing the robotics 110. To map between the host's element addresses and the library's physical element addresses, the controller 108 maintains the library map 116.

Figure 2:
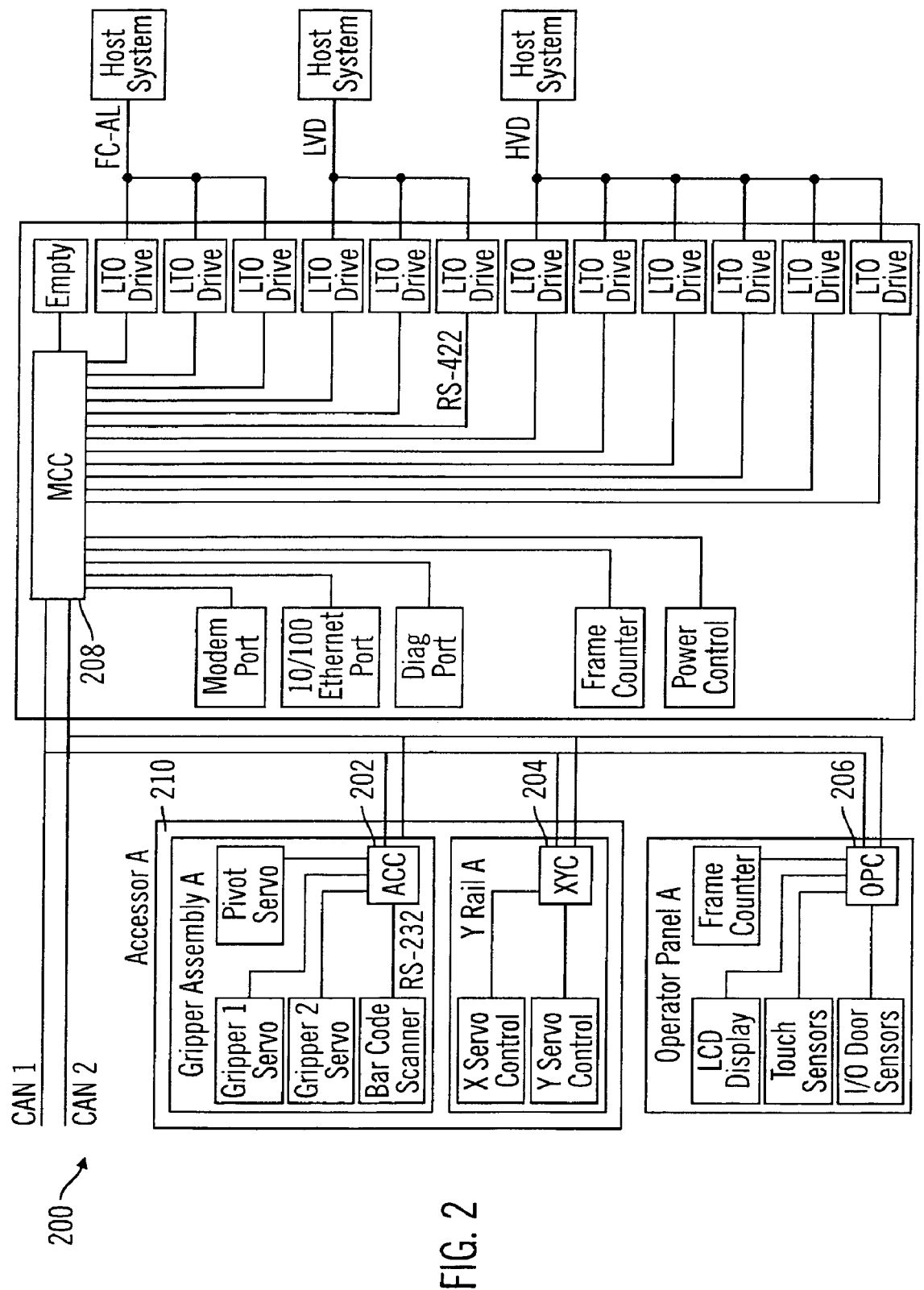
FIG. 2 illustrates a library in accordance with certain implementations of the invention.

FIG. 2 illustrates a library 200 in accordance with certain implementations of the invention. In certain implementations, the portable data storage media in the library 200 include cartridges. The library 200 includes a distributed control system of node card types, such as, an Accessor Controller (ACC) 202, XY Controller (XYC) 204, Operator Panel Controller (OPC) 206, and Medium Changer Controller (MCC) 208. A node card is a circuit board that communicates with other node cards via one or more communication interfaces, such as a Controller Area Network (CAN) interface. The CAN interface is a multi-drop network interface and is a serial bus system. In certain implementations, the library 200 may comprise an IBM 3584 that includes the four node cards (ACC, XYC, OPC, and MCC).

The Accessor Controller (ACC) node card 202 controls basic accessor functions, including, for example, cartridge handling, accessor work queuing, reading cartridge labels with a bar code scanner. The XY Controller (XYC) node card 204 controls X and Y motion of a gripper that grips cartridges. The Operator Panel Controller (OPC) node card 206 controls basic operator panel functions, including, for example, Liquid Crystal Display (LCD) output, touch panel input, and Input/Output (I/O) station locks and sensors. The Medium Changer Controller (MCC) node card 208 provides external interfaces that include host communications, drive communication, Ethernet communications for Simple Network Management Protocol (SNMP) or World Wide Web ("web") support, and direct current (DC) power management.

The library 200 moves cartridges between storage and drives. An accessor (with a gripper assembly) travels along an X rail under control of the XYC node card 204. A gripper assembly travels along a Y rail under control of the XYC node card 204. The gripper assembly may pivot between two parallel walls of storage and may pick or place cartridges with one of two grippers, all under control of the ACC node card 202.

In FIG. 2, a single frame is illustrated for a library 200. A frame includes the displayed architecture along with a hardware support structure and covers. A library 200 may be treated as one or more logical libraries. Each logical library may be associated with one or more application programs. In certain implementations, the frame illustrated in FIG. 2 may be the first frame in a multi-frame library.

The frame may include one or more drives. Storage may be installed in place of drives and may be added, for example, in three sets (e.g., one set per four drive positions). The drives may be any mix of Small Computer Systems Interface (SCSI) Low Voltage Differential (LVD) or High Voltage Differential (HVD) and Fibre Channel. The drives connect to the MCC node card 208 for library/drive communication. In the example of FIG. 2, the library/host communication travels through this connection also.

The MCC node card 208 also contains a diagnostic interface, a 10/100 Ethernet interface, a serial interface for connecting to a modem, circuits to control the DC power in the library 200, and frame counting circuits. The diagnostic interface uses a proprietary protocol and command structure and is used, for example, by repair personnel. The 10/100 Ethernet interface provides Simple Network Management Protocol (SNMP) support and Hyper Text Transfer Protocol (HTTP) support, which provides a web user interface. The modem interface allows the library 200 to call the repair center for help and allows the repair center to call the library 200. The DC power is monitored and controlled by the MCC node card 208, and the DC power supply fans are also monitored. The frame counter circuits can count the number of frames in the library 200. The MCC node card 208 can also tell which frame number it is connected to, as well as any doors that may be open in any frames.

The accessor 210 is an assembly that contains an XY motion control card and motors (i.e., a Y rail assembly) and a dual gripper motion control card and motors (i.e., gripper assembly). The Y rail assembly moves back and forth along the length of the library 200 on the X rail. The gripper assembly moves up and down the Y rail. The gripper assembly contains a bar code scanner for reading cartridge labels. In certain implementations, the gripper assembly contains a smart card reader for reading the electronic memory (e.g., Cartridge Memory (CM), Memory In Cartridge (MIC), etc.) inside a cartridge. The gripper assembly contains two grippers for mixed media support (e.g., two different media types in a single library 200) or contains a redundant gripper for a single media type. In addition, each gripper may support more than one media type. The grippers are mounted in a cage that can pivot from one side of the library 200 to the other side of the library 200. This allows access to both walls of storage by either gripper.

An operator panel contains a high resolution LCD display, a touch screen for user input, the same frame counter that the MCC node card 208 contains, and circuits to monitor and control the I/O station doors. The I/O station doors are manually opened and closed by an operator. Lock mechanisms are controlled by the OPC node card 206 and will prevent the user from opening a door. Sensors monitor the state of the doors (e.g., opened, closed, locked).

Figure 3:
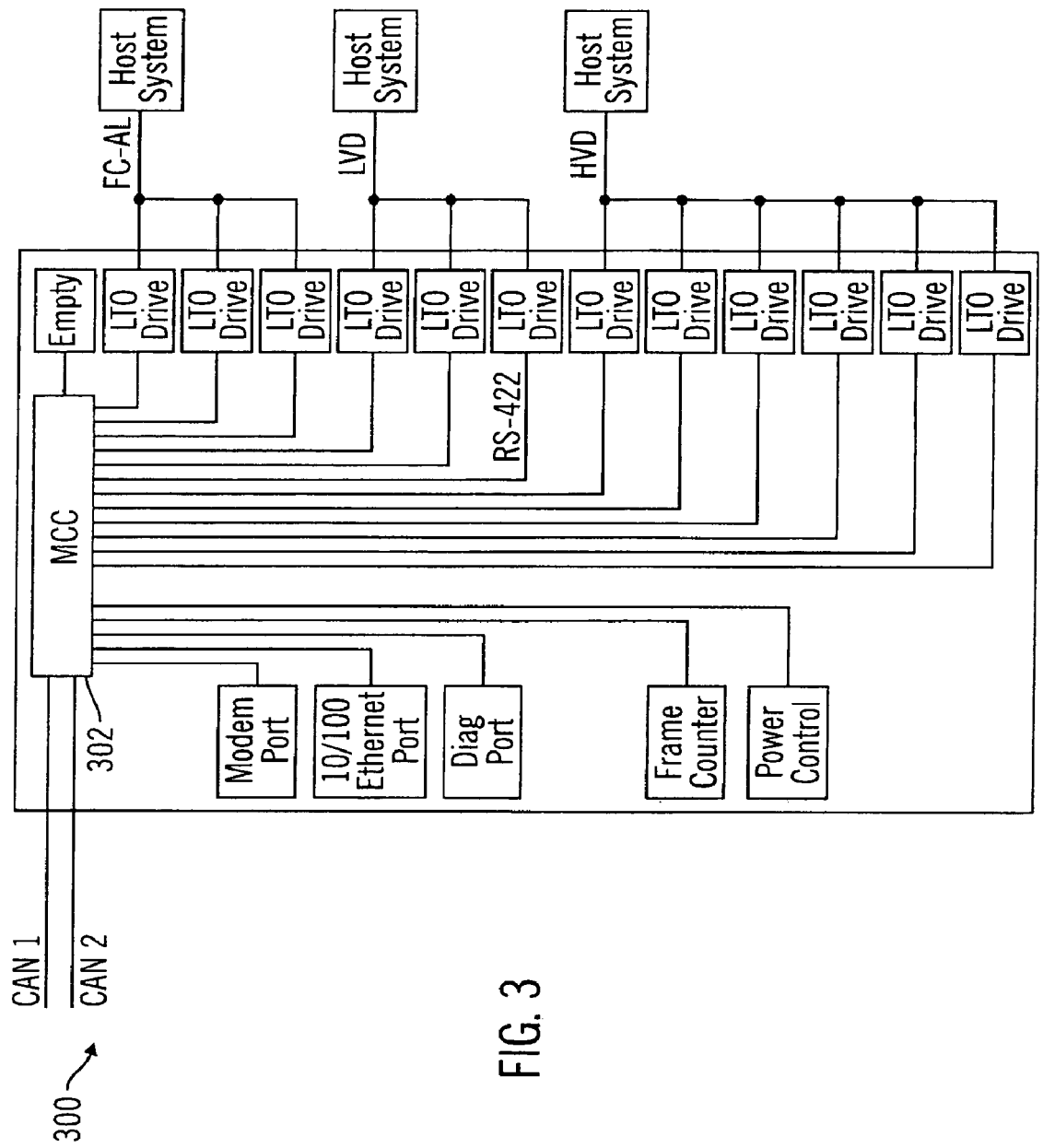
FIG. 3 illustrates an additional storage frame in accordance with certain implementations of the invention.

FIG. 3 illustrates an additional storage frame 300 being added to expand the capacity of a library 200 (FIG. 2) in accordance with certain implementations of the invention. Additional drives may also be added. Another MCC node card 302 is included in the additional frames whenever drives are present.

Figure 4:
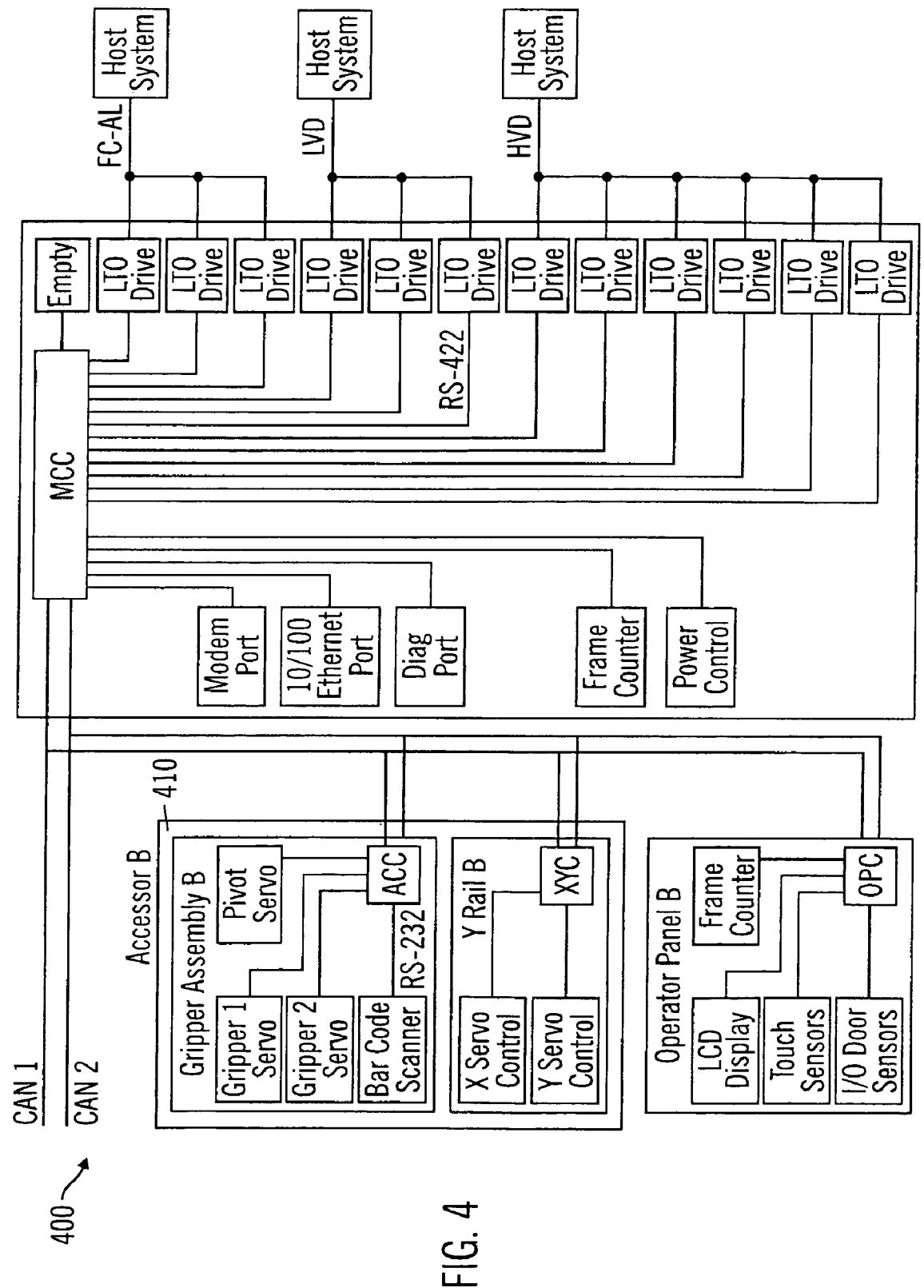
FIG. 4 illustrates additional nodes associated with adding a second accessor in accordance with certain implementations of the invention.

An additional accessor may be added to improve performance and to add redundancy to the library operation for library 200 (FIG. 2). FIG. 4 illustrates addition of a second accessor 410 to library 200 (FIG. 2) in accordance with certain implementations of the invention. A failure of the first accessor 210 results in the second accessor 410 taking over. The two accessors 210, 410 may work one-at-a-time (i.e., "hot standby") or may work together (i.e., "dual active").

Figure 5:
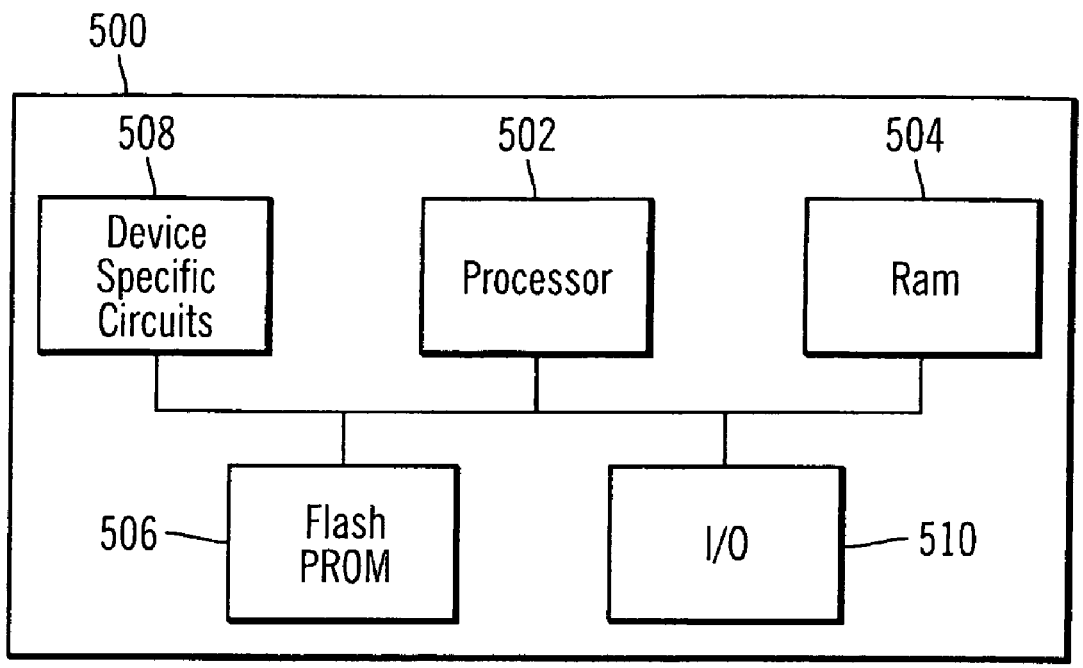
FIG. 5 illustrates a computer architecture in accordance with certain implementations of the invention.

FIG. 5 illustrates a computer architecture 500 in accordance with certain implementations of the invention. The computer architecture includes a processor 502, Random Access Memory (RAM) 504, flash Programmable Read-Only Memory (PROM) 506, device specific circuits 508, and input/output (I/O) 510. In certain implementations, the RAM 504 and/or flash PROM 506 may be contained in a microprocessor as could the device specific circuits 508 and I/O 510. The I/O 510 may be any form of communication interface that allows the processor 500 to communicate over, for example, a network with computers, devices, etc. For example, the I/O 510 may include serial interfaces (e.g., RS-232, Universal Serial Bus (USB), FireWire, CAN, or Ethernet) and/or SCSI or Fibre Channel interfaces. The device specific circuits 508 provide additional hardware to enable the embedded system implementing implementations of the invention to perform unique functions, such as motor control of robotic grippers and accessor for an automated data storage library.

As an initialization step, the host queries element address ranges by type (i.e., host medium transport element, host storage element, host import export element, and host data transfer element). For example, when the library is first installed, an initial inventory is performed by the library to determine the status of elements in storage slots. Upon completion of initial inventory of the library, any storage slots with cartridges detected are reported to the application programs as occupied host import export elements and/or occupied host storage elements. A host import export element remains in the "occupied" state until an application program or operator moves the cartridge from the host import export element, in which case the host import export element becomes "available." Also, the tables 116, 118, and 120 are initialized in response to some resetting events.

In one example, a move command (e.g., a SCSI Move Medium command) is built by an application to move a cartridge from a host import export element (i.e., a source element) to a host storage element (i.e., a destination element). When the move command is received by the library, specifying a source host import export element and a destination host storage element, no actual physical movement takes place of the cartridge from the source to the destination element. Instead, the storage slot requested as the source and containing the cartridge is associated with the logical library of the application program issuing the move command and, specifically, is associated with a host element address equal to the destination element address provided within the move command.

For example, a logical library may contain 10 storage slots, numbered (1,1) Left through (1, 10) Left. Assume that after scanning the storage slots, cartridge ABC001 is in storage slot (1, 2) Left and cartridge XYZ001 is in storage slot (1, 5) Left. For this example, each logical library reports containing 10 host import export elements and 10 host storage elements. The two storage slots containing cartridges are treated as host import export elements. Host import export element 1 is mapped to storage slot (1, 2) Left, and host import export element 2 is mapped to storage slot (1, 5) Left. Therefore, after the initial inventory of the library, all host storage elements are reported to an application program to be empty, while host import export elements 1 and 2 are reported as full. When an application program, assigned to logical library 1 for this example, issues a move command from host import export element 1 to host storage element 9, no physical movement of the cartridge takes place. Instead, the storage slot (1, 2) Left (which mapped to host import export element 1) is now mapped to host storage element 9, host import export element 1 is now reported to be empty, and host storage element 9, for logical library 1, is reported as full. Host storage element 9 for all other logical libraries is still represented as empty until a move specific to that logical library's host storage element 9 is requested.

Figure 6:
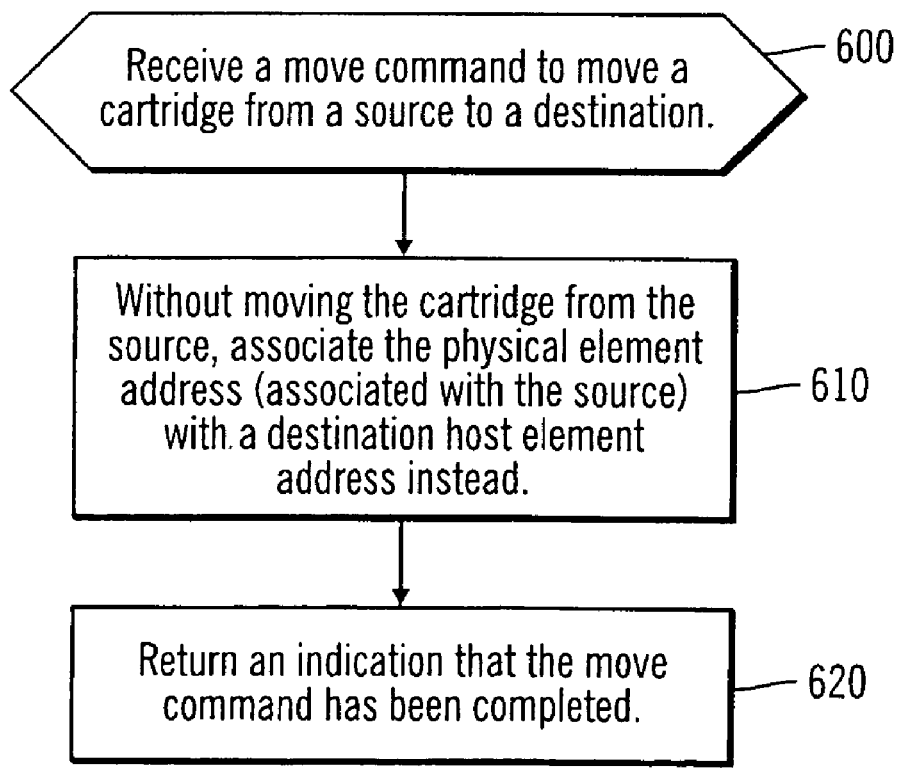
FIG. 6 illustrates logic implemented to allow virtualization of host storage elements and host import export elements in accordance with certain implementations of the invention.

FIG. 6 illustrates logic implemented to allow virtualization of host storage elements and host import export elements in accordance with certain implementations of the invention. Control begins at block 600 with receipt of a move command (e.g., from an application program) to move a cartridge from a source to a destination. A move command (e.g., a SCSI Move Medium command) is built by an application to move a cartridge from a source element (e.g., a host import export element) to a destination element (e.g., a host storage element). The addresses are unique across types of addresses, and so, in this example, the move command does not specify an element type. In block 610, without moving the cartridge from the source, the physical element address associated with the source is instead associated with a destination host element address. In particular, the library map 116 and volser table 120 are updated to indicate that the storage slot is associated with a host storage element for the associated logical library. In block 620, an indication is returned (e.g., to the application program from which the move command was received) to indicate that the move command has been completed.

Figure 7:
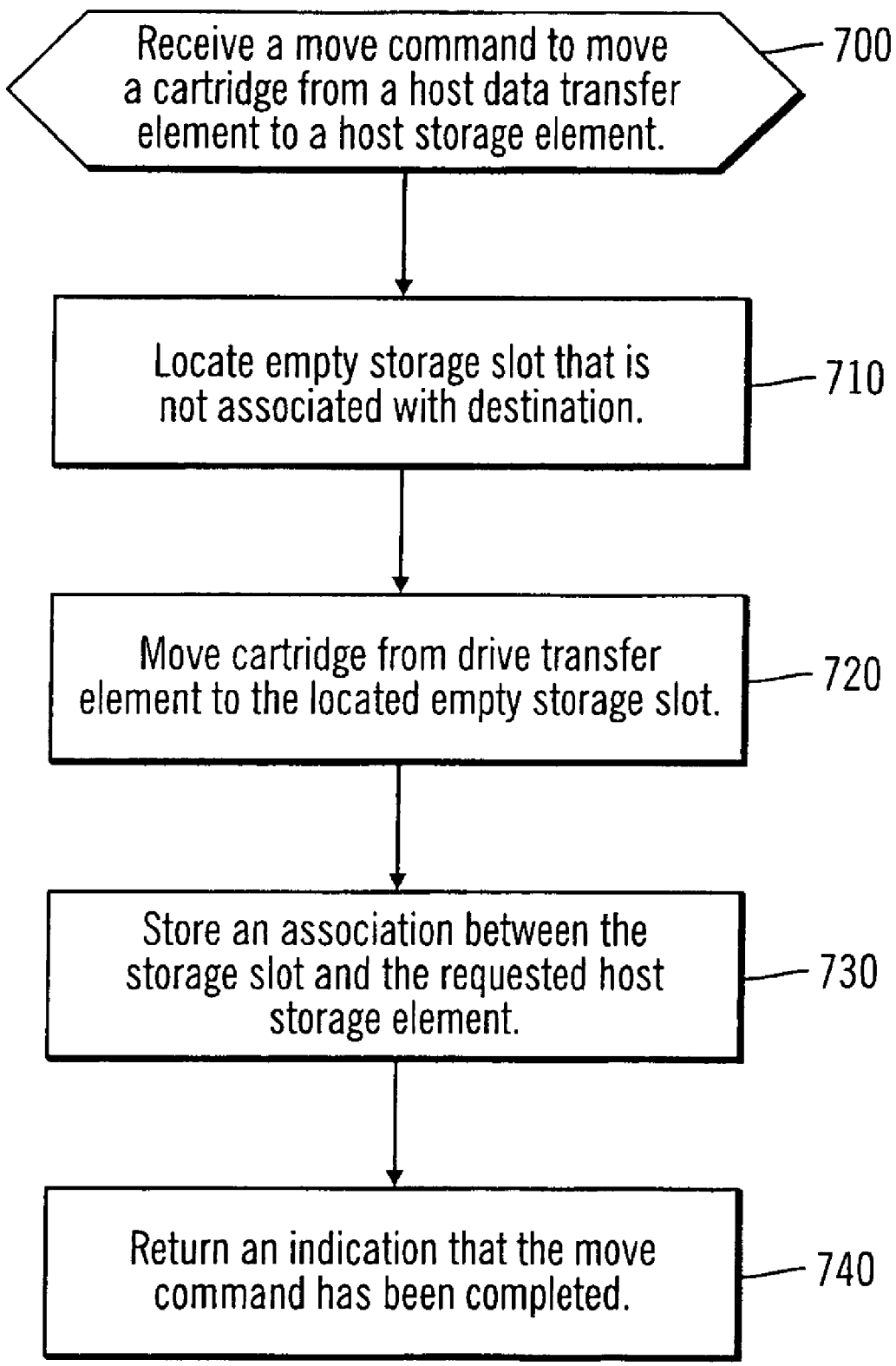
FIG. 7 illustrates logic for using a floating home slot in accordance with certain implementations of the invention.

FIG. 7 illustrates logic for using a floating home slot in accordance with certain implementations of the invention. Control begins at block 700 with receipt of a move command (e.g., from an application program) to move a cartridge from a host data transfer element to a host storage element. In block 710, an empty storage slot is located that is not associated with the destination. In certain implementations, this is the closest empty storage slot. In block 720, the cartridge is moved from the host data transfer element to the located empty storage slot. In block 730, an association is stored between the storage slot and the host storage element requested in the move command. For example, the library map 116 may show the host storage element of block 700 associated with a physical storage element (i.e., the empty storage slot) of block 710. In block 740, an indication is returned (e.g., to the application program from which the move command was received) to indicate that the move command has been completed.

For example, assume that cartridge DEF001 is in host data transfer element (DTE) 6 and is in logical library 2. When an application program issues a move command to move a cartridge from the host data transfer element to a host storage element, a storage slot in close proximity to the host data transfer element is selected for putting the cartridge away. This storage slot is mapped to the host storage element. As such, the move command (e.g., a SCSI Move Medium command) may specify the source element as host data transfer element 6, while the destination element may be storage element 200. Assuming the storage slot (3, 50) Right is in close proximity to host data transfer element 6 and is also empty, the cartridge is moved to storage slot (3, 50) Right, which is mapped to storage element 200. Should a host application program 104 now want to move the cartridge from storage element 200 to host data transfer element 6, the cartridge in storage slot (3, 50) Right will be retrieved. This type of allocation takes advantage of performance enhancements provided by a floating home slot. Unlike a fixed home slot, a floating home slot allows a cartridge to be put into the nearest possible storage element.

Since the storage slots are virtualized, there is no need to partition a physical library into logical libraries where the total number of host storage elements in all logical libraries is equal to the total number of storage slots in the physical library. Instead, each logical library may be assigned a storage element count equal to the total number of storage slots in the physical library. For instance, after the initial inventory, if all host import export elements were full, it is possible for a single logical library to import all the cartridges. Another scenario is that each logical library imports cartridges from a portion of the host import export elements. Thus, any logical library can import any cartridge in a host import export element until such time that there are no longer any empty storage slots in the library for storing the imported cartridges. Thus, a logical library that was initially thought to require a fraction of the storage slots can easily go beyond that merely by importing a cartridge from a host import export element. In other words, storage slots are not allocated to a logical library until they are occupied.

Figure 8:
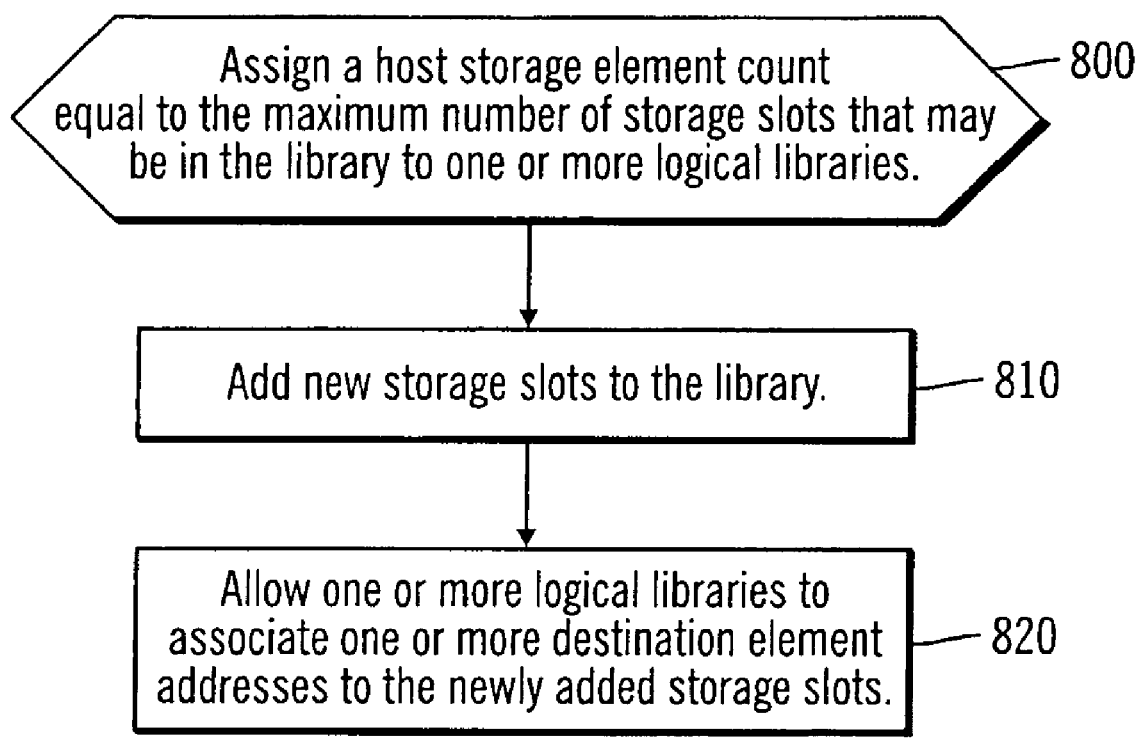
FIG. 8 illustrates logic for physical and logical capacity expansion without disruption of the library in accordance with certain implementations of the invention.

FIG. 8 illustrates logic for physical and logical capacity expansion without disruption of the library in accordance with certain implementations of the invention. Control begins in block 800 with a host storage element count equal to the maximum number of storage slots that may be in the library being assigned to one or more logical libraries. Alternatively, this count may be more or less than the library maximum. In block 810, new storage slots are added to the library. This may comprise the addition of storage slots or storage modules that are already present but not previously allowed to be associated with any logical library. In block 820, one or more logical libraries are allowed to associate one or more destination element addresses to the newly added storage slots. Typically, this is done when a cartridge is moved into the newly added slot.

For example, assuming that there is a library with 6 frames, then a $7^{th}$ frame may be added without reconfiguration of the library or any associated host application to get access to the new storage slots provided by the $7^{th}$ frame (i.e., a physical capacity expansion). With implementations of the invention, if the maximum size of a library is 16 frames, and, correspondingly, 6000 storage slots, and the number of available host storage elements in every logical library is reported to be 6000 storage elements, no further configuration of the application programs is required when adding or removing frames. Instead, each logical library is able to associate the new storage slots as needed because the total number of host reported slots has not changed. In another example, the library may have 6000 storage slots, and an application program may have access to 3000 host storage element addresses (e.g., in accordance with a license agreement). Later, the application program may have access to all 6000 host storage element addresses (e.g., in accordance with a new or modified license agreement). That is, the new storage slots may comprise storage slots whose status is changed from a status of not being eligible to be associated with one or more logical libraries to being eligible to be associated with one or more logical libraries. In this case (i.e., a logical capacity expansion) also, there is no disruption of the library in order to add additional host storage element addresses.

FIGS. 9A, 9B, and 9C illustrate Table A 900, which illustrates SCSI moves in accordance with certain implementations of the invention. In particular, after validating the source is full and destination is empty using the library map 116 (i.e., for host import export element data and host storage element data) and library status table 118 (i.e., for host data transfer element data and host medium transport element data), the steps in Table A are performed based on the source and destination element address type.

In particular, for a move command that moves a cartridge from a host storage element to a host storage element, the source host storage element entry is removed from the library map 116. A destination host storage element entry is added to the library map 116. Then, the volser table 120 is updated and status is returned.

For a move command that moves a cartridge from a host storage element to a host import export element, the source host storage element entry is removed from the library map 116. A destination host import export element entry is added to the library map 116. Then, the volser table 120 is updated and status is returned. Moreover, a physical move to any empty I/O slot is queued to allow operator removal of the cartridge.

For a move command that moves a cartridge from a host storage element to a data transfer element, a move is performed. The library status table 118 is updated. The source host storage element entry is removed from the library map 116. Then, the volser table 120 is updated and status is returned.

For a move command that moves a cartridge from a host import export element to a host storage element, if the volser of the cartridge is not assigned to a logical library, as indicated in by the volser table 120, a logical library number is assigned. The source host import export element entry is removed from the library map 116. A destination host storage element entry is added to the library map 116. The volser table 120 is updated and status is returned.

For a move command that moves a cartridge from a host import export element to a host import export element, the source host import export element entry is removed from the library map 116. A destination host import export element entry is added to the library map 116. The volser table 120 is updated and status is returned. As described above, a physical move should already have been queued or already complete.

For a move command that moves a cartridge from a host import export element to a data transfer element, if a logical library number for the destination indicates that the element is not assigned to a logical library, a logical library number is assigned. A move is performed, and the library status table 118 is updated. The source host import export element entry is removed from the library map 116. The volser table 120 is updated and status is returned.

For a move command that moves a cartridge from a data transfer element or a medium transport element to a host storage element, a move is performed to any available storage slot, and the library status table 118 is updated. A destination host storage element entry is added to the library map 116. The volser table 120 is updated and status is returned.

For a move command that moves a cartridge from a data transfer element or a medium transport element to a host import export element, a move is performed to any available storage slot, and the library status table 118 is updated. A destination host import export element entry is added to the library map 116. The volser table 120 is updated and status is returned. Additionally, a physical move to any empty I/O slot is queued to allow operator removal of the cartridge.

For a move command that moves a cartridge from a data transfer element or a medium transport element to a data transfer element, the move is performed, which updates the library status table 118. The volser table 120 is updated and status is returned.

For SCSI read element status, the library responds using the library map 116 for import export elements and storage elements and the library status table 118 for data transfer elements and medium transport elements. As for using the library map 116, a library map 116 entry has a pointer into the library status table 118, and, if no library map 116 entry exists, the element is reported as empty.

IBM is a trademark or registered trademark of International Business Machines Corporation in the United States and/or foreign countries.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 6-13 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The illustrated logic of FIGS. 6-13 was described as being implemented in software. The logic may be implemented in hardware or in programmable and non-programmable gate array logic.

While the figures and accompanying text describe certain implementations of the invention that refer to logical libraries and partitions, other implementations of the invention may not require multiple logical libraries and/or partitioning.

Figure 10:
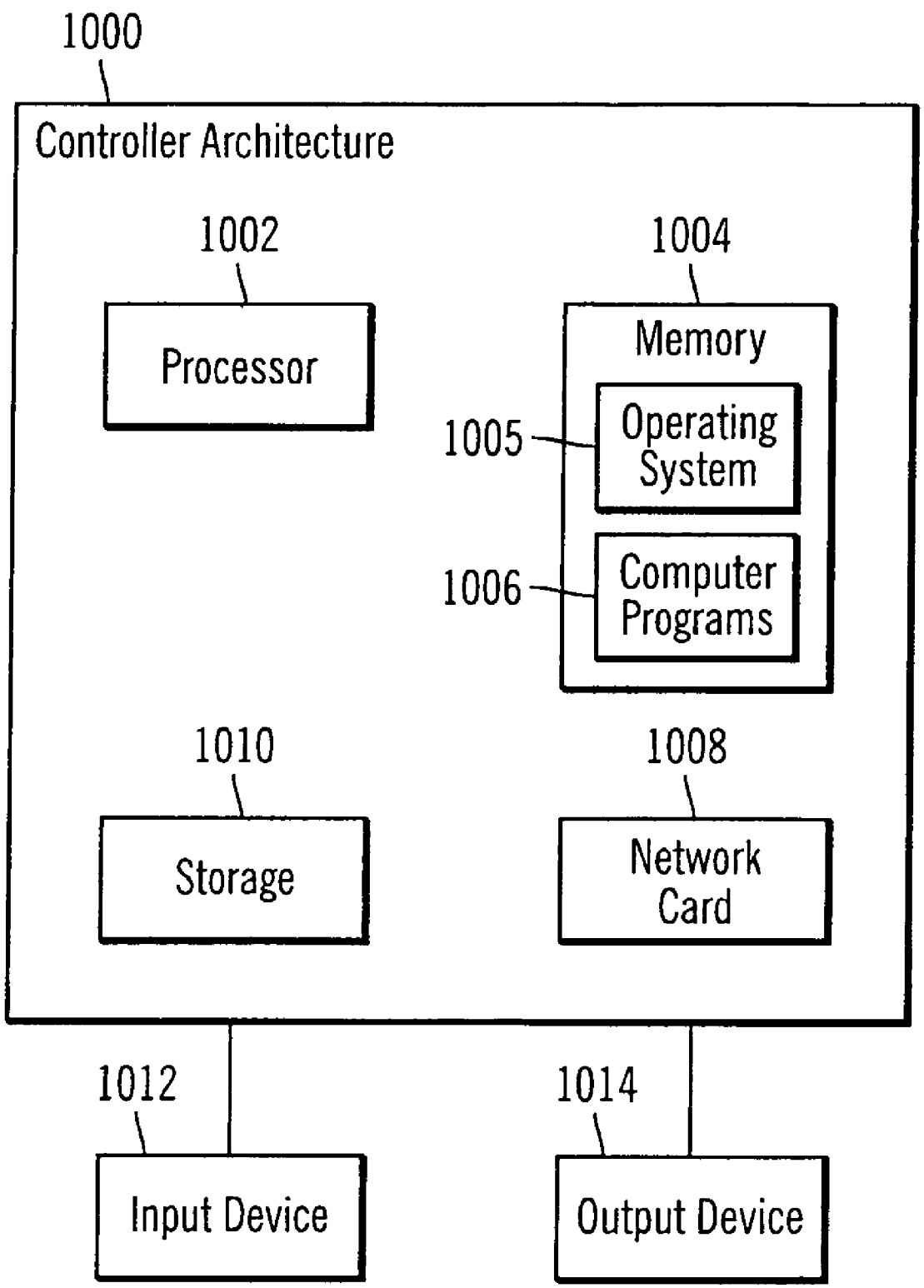
FIG. 10 illustrates one implementation of the architecture of host or library of FIG. 1 in accordance with certain implementations of the invention.

FIG. 10 illustrates one implementation of the architecture of the host 102 and controller 108 in accordance with certain implementations of the invention. The host 102 and controller 108 may implement a computer architecture 1000 having a processor 1002 (e.g., a microprocessor), a memory 1004 (e.g., a volatile memory device), a network card 1008, and storage 1010 (e.g., a non-volatile storage area, such as magnetic disk drives, optical disk drives, a tape drive, non-volatile RAM, etc.). An operating system 1005 may execute in memory 1004. The storage 1010 may comprise an internal storage device or an attached or network accessible storage. Computer programs 1006 are loaded into the memory 1004 from the storage 1010 and executed by the processor 1002 in a manner known in the art. A network card 1008 enables communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for using storage slots, comprising:
partitioning a physical library into multiple logical libraries; and
assigning a storage element count to each one of the multiple logical libraries, wherein a sum of the storage element count assigned to each one of the multiple logical libraries exceeds a total number of storage slots in the physical library.

2. The method of claim 1, wherein the storage element count for one or more of the multiple logical libraries is equal to a total number of storage slots in the physical library.

3. The method of claim 1, further comprising:
allowing one or more of the multiple logical libraries to be associated with any storage slot in the physical library.

4. A method for assigning storage slots, comprising:
partitioning a physical library into one or more logical libraries;
assigning a storage slot count greater than a total number of storage slots in the physical library to the one or more logical libraries;
adding new storage slots to the physical library; and
allowing one or more of the logical libraries to be associated with the newly added storage slots without reconfiguration of the physical library.

5. The method of claim 4, wherein the storage slot count equals a maximum number of storage slots that may subsequently be in the physical library.

6. The method of claim 4, further comprising:
adding a new frame to the physical library that includes the new storage slots.

7. The method of claim 4, wherein the new storage slots comprise storage slots whose status is changed from a status of not being eligible to be associated with one or more of the logical libraries to being eligible to be associated with one or more of the logical libraries.

\* \* \* \* \*